March 6, 1945. L. V. LUCIA 2,370,674
FILTERING DEVICE
Filed Oct. 3, 1941
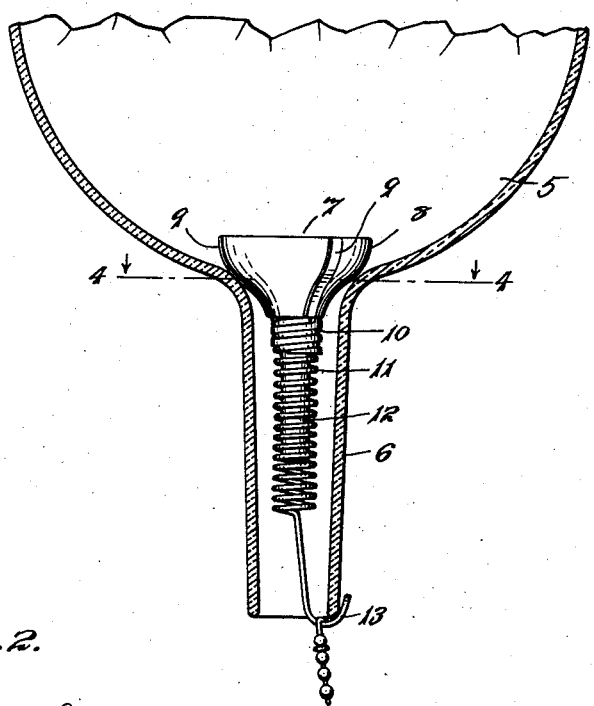
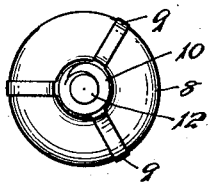
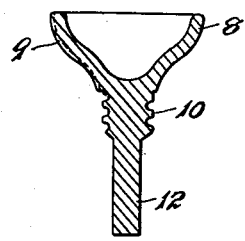
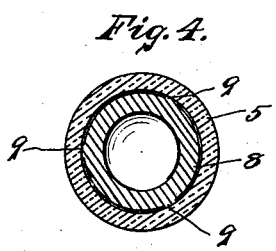
INVENTOR.
Louis V. Lucia Patented Mar. 6, 1945

2,370,674

UNITED STATES PATENT OFFICE 2,370,674

FILTERING DEVICE

Louis V. Lucia, West Hartford, Conn., assignor to The Silex Company, Hartford, Conn., a corporation of Connecticut Application October 3, 1941, Serial No. 413,471

4 Claims. (Cl. 210—162)

This invention relates to cloth-less filters as are more particularly intended for use in coffee makers of the vacuum type.

In such coffee makers it is highly desirable that the coffee brew be filtered in a reasonably short time from the coffee grounds in the upper bowl of the coffee maker so as to prevent the extraction of undesirable elements from the coffee. At the same time, it is also desirable to properly filter the grounds from the brew by preventing them from passing past the filtering element into the lower bowl where the coffee brew is contained.

In such devices as have been heretofore used, where a cloth strainer has not been required, as in the case of the filter embodying the present invention, the filter has generally consisted of a roughened or knurled surface contacting with the surface adjacent the mouth of the upper bowl stem.

Such filtering surfaces have been found to be inefficient since they present obstructions in the filtering space, on the line of filtration, which tend to retard the flow of liquid through the filtering space. In effect, such obstructions serve no other purpose than to merely reduce the amount of filtering space provided around the mouth of the stem and thereby retard the filtering process.

It is to be understood that to obtain efficient filtration, it is only important that the filtering space between the surface around the mouth of the stem of the upper bowl and the adjacent surface of the filtering member be less than the size of the smallest coffee grounds which are to be filtered from the coffee brew so as to prevent said grounds from passing through the filtering space. It is not necessary that knurls or interruptions be provided in the filtering space along the line of filtration, or the line defined by the adjacent surfaces around the stem mouth, as these knurls or obstructions serve only to retard the filtration and perform no useful function in increasing the efficiency of the devices.

The object of the invention therefore is to provide a filtering device which is highly efficient in its operation and which will reduce the length of time required for filtering.

A further object is to provide for a more positive positioning of the filter in the coffee maker so as to insure proper filtration.

Further objects of the invention will be more clearly understood from the following description and from the accompanying drawing in which:

Fig. 1 is a side view of my improved filter showing the same in position in the upper bowl of a coffee maker which is illustrated in central vertical section.

Fig. 2 is a bottom view of the filter in elevation.

Fig. 3 is a view of the filter in central vertical section.

Fig. 4 is a plan view in section on line 4—4 of Fig. 1.

As illustrated in the drawing, the numeral 5 denotes an upper bowl such as used in coffee makers of the vacuum type and which has a depending stem 6 which fits within the neck a lower bowl as commonly known.

The present invention pertains to a filter which preferably consists of a member 7 that is adapted to fit in the mouth of the stem 6 as clearly illustrated in the drawing. The said member has an upwardly flared cup-shaped portion 8 substantially closing the mouth of the stem 6 and spaced from the surface of the stem mouth by means of supporting ribs 9 on the surface of the portion 8. These ribs project slightly above said surface and there are preferably three of them used in order to provide a three-point bearing for the portion 8 whereby it is firmly supported in the mouth of the stem against accidental displacement relative to the surface of the mouth to assure a definite spacing between the surface of the filter and that of the mouth. In practice, it has been found that a height of .015 to .020 of an inch is preferred for the height of these ribs. This therefore leaves an equal clearance between the relative surfaces of the filter and the mouth of the stem which provides a substantially unbroken filtering space area line of filtration which assures proper filtration with maximum speed.

In the form shown in the drawing, the filter is provided with a threaded portion 10 adapted to receive the end of a coil spring 11 by simply threading the said spring thereonto. A stem 12 depends from the said threaded portion and fits within the spring 11 to position the filter against tilting movement relative to the stem 6. The spring 11 is preferably provided with a hook 13 whereby it may be attached to the end of the stem 6 for resiliently retaining the filter in seated position within the mouth of the stem.

While I have illustrated and described one embodiment of my invention it is to be clearly understood that the same may be used in filters of other forms as those herein shown without departing from the scope thereof as set forth in the appended claims.

I claim:

1. A filter of the character described comprising a member having a filtering head, a threaded portion adjacent to said head, a spring secured to said threaded portion for retaining said head against the mouth of a hollow stem in an upper bowl of a coffee maker, a stem depending from said threaded portion into said spring, and means for securing said spring to said hollow stem.

2. A filter comprising a member having a filtering portion, a spring receiving portion depending from said filtering portion and having a spiral groove therein, a stem depending from said spring receiving portion, a spring surrounding said stem and extending into said spiral groove, and means for securing said spring to retain said filtering portion in filtering position.

3. A filter comprising a member including a filtering portion, a stem depending from said portion, an enlarged portion on said stem adjacent to said filtering portion and a spring surrounding said stem; said enlarged portion having a thread thereon for receiving one end of said spring; the bottom of said thread running from the surface of said stem to a larger diameter for expanding the end of the spring as it is threaded thereto and thereby preventing unthreading of said spring from said threaded portion, and anchoring means at the opposite end of said spring.

4. A filter of the character described comprising a member having a filtering head with a portion depending therefrom, said portion having a spiral groove running upwardly thereon, a spiral spring threaded to said groove, and means for securing said spring to a hollow stem in an upper bowl of a coffee maker for retaining said head against the mouth of said hollow stem.

LOUIS V. LUCIA.